United States Patent [19]

Lyvers

[11] 4,249,853
[45] Feb. 10, 1981

[54] APPARATUS FOR LOADING AND UNLOADING A VEHICLE

[76] Inventor: Daniel L. Lyvers, 3331 Kirkfield Dr., Fort Wayne, Ind. 46805

[21] Appl. No.: 30,086

[22] Filed: Apr. 16, 1979

[51] Int. Cl.³ .............................................. B60P 1/54
[52] U.S. Cl. .................................... 414/543; 212/211
[58] Field of Search .............................. 414/539–543; 212/17

[56] References Cited

U.S. PATENT DOCUMENTS

| 2,679,938 | 6/1954 | Willows | 212/17 |
| 2,846,081 | 8/1958 | Moore | 212/17 |
| 3,482,716 | 12/1969 | Leadley | 414/543 |
| 3,572,513 | 3/1971 | Tantlinger et al. | 414/542 X |

FOREIGN PATENT DOCUMENTS

| 210515 | 3/1956 | Australia | 414/542 |

Primary Examiner—Jeffrey V. Nase
Attorney, Agent, or Firm—Gust, Irish, Jeffers & Hoffman

[57] ABSTRACT

Apparatus for loading and unloading a vehicle comprising a supporting frame having a pair of parallel spaced horizontally extending elongated tracks supported near the ends thereof by upstanding legs and elongated cross members operatively secured to said tracks adjacent the upper ends of said legs thereby defining a loading space within said frame. A hoist carrier is mounted on the tracks for movement longitudinally thereof. The carrier lies substantially within the plane of the tracks near the top of the space. A hoist boom is pivotally mounted on the carrier adjacent one of the tracks, the boom extending horizontally beneath the carrier and being swingable across the space between the tracks. The boom is also movable with the carrier longitudinally of the frame.

8 Claims, 6 Drawing Figures

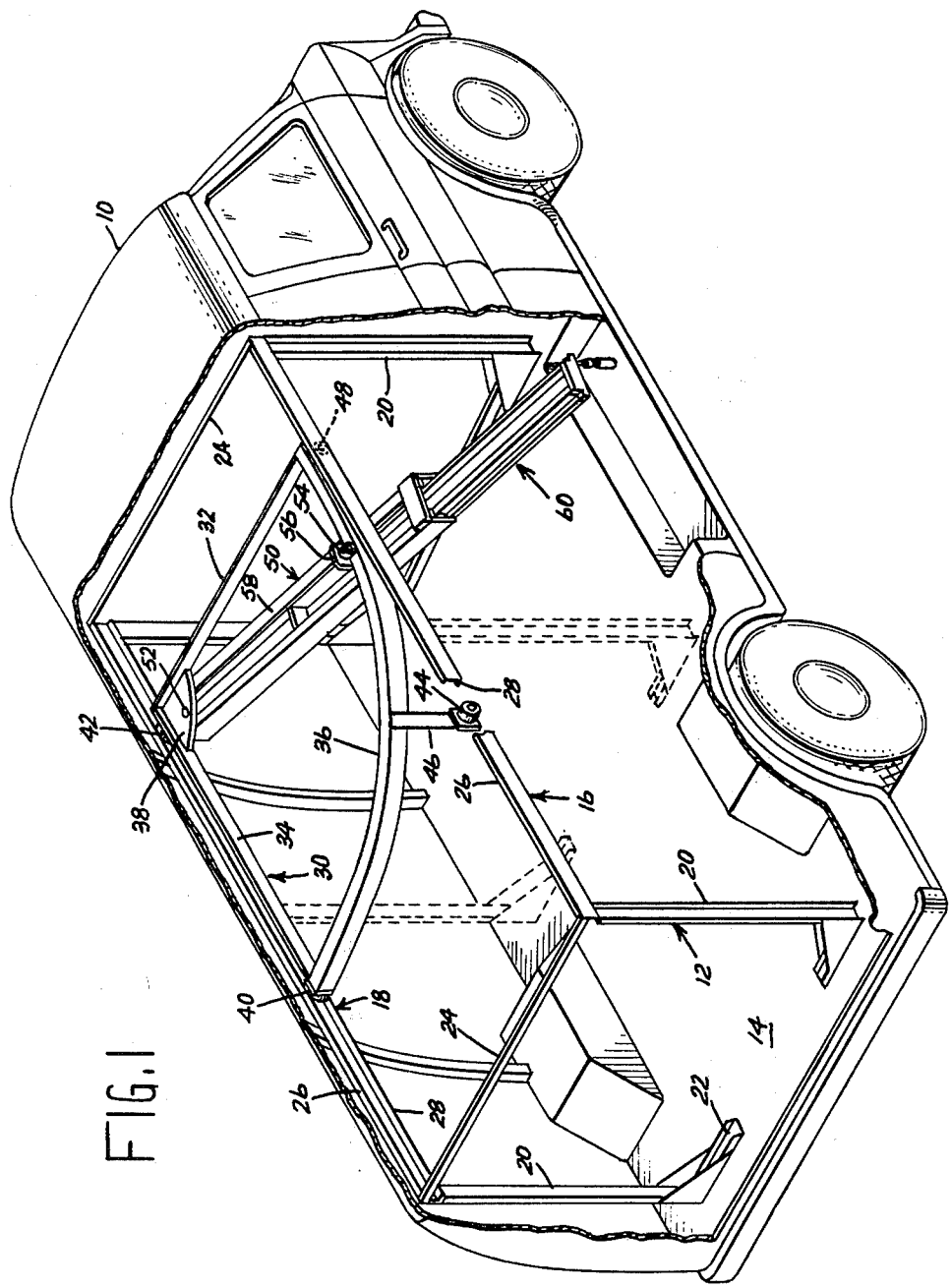

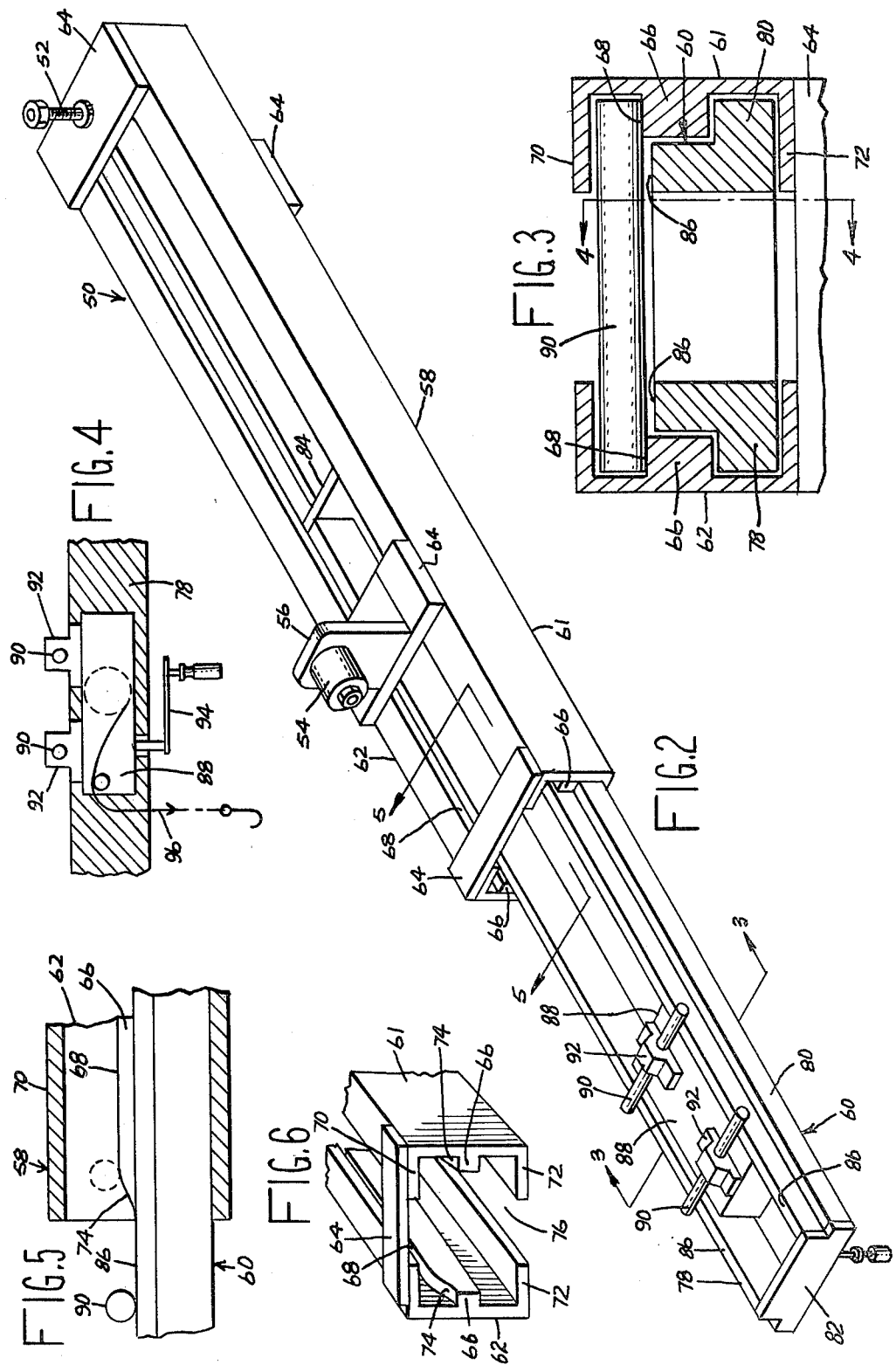

APPARATUS FOR LOADING AND UNLOADING A VEHICLE

BACKGROUND OF THE INVENTION

1. Field of the Invention

The present invention relates to apparatus for loading and unloading vehicles and more particularly to an apparatus of simple construction capable of loading and unloading from the side and rear of a vehicle.

2. Description of the Prior Art

Apparatuses for loading and unloading vehicles are known, typical of these being disclosed in U.S. Pat. Nos. 890,151; 3,572,513 and 3,910,432. Such prior art arrangements include a framework movable along tracks disposed adjacent the vehicle floor, the framework carrying a swingable boom in elevated position for hoisting loads from and onto the vehicle floor. In another arrangement, a framework mounted on the floor is equipped with a trolley system movable longitudinally and laterally whereby loads may be manipulated to different positions within the vehicle. Still another arrangement provides a boom on the trolley system which is swingable both vertically and horizontally for handling loads.

SUMMARY OF THE INVENTION

This invention relates to apparatus for loading and unloading a vehicle which comprises a supporting frame having a pair of parallel spaced horizontally extending elongated tracks supported near the ends thereof by upstanding legs and elongated cross members operatively secured to the tracks adjacent the upper ends of the legs thereby defining a loading space within the frame. A hoist carrier is mounted on the tracks for movement longitudinally thereof. The carrier lies substantially within the plane of the tracks to be disposed at the top portion of the space. A hoist boom pivotally mounted on the carrier adjacent one of the tracks extends horizontally beneath the carrier and is swingable across the space between and beyond the tracks. The boom may therefore be operated to load the vehicle from the rear or side thereof.

Preferably, the boom is extensible and includes a first elongated hollow section which receives for longitudinal telescoping movement a second elongated section. The first section includes two channel-like elements having the open sides in facing relation, each channel-like element being provided with an elongated rail on the inner side which is spaced from and parallel to the flanges thereof. The rails are provided with ramp portions on the outer ends thereof which merge with upper flat surfaces which extend parallel to the flanges.

The second section includes two elongated members L-shaped in cross-section which are secured together by means of cross members. The two members are disposed with the stepped sides outermost, the widest portion of the stepped sides being slidably received between the lower flanges and rails of the first section. The upper surface of the second section is disposed beneath the flat upper surfaces of the rails.

A hoist support block is movably disposed within the second section and is provided with a bearing device which mounts for rotation at least one elongated roller element. The opposite end portions of the roller element are rotatably engaged with the upper surfaces of the second section and further is engageable with the aforesaid ramp portions and upper surfaces of the rails whereby the hoist support block can be moved into the first section and lifted from engagement with the second section. The second section as well as the hoist support block may thereby be telescoped to a position within the first section.

It is an object of this invention to provide an apparatus for loading and unloading a vehicle, which is of simplified construction and of maximum strength and can be operated to lift and move loads horizontally in swinging and in rectilinear directions.

It is another object of this invention to provide such an apparatus wherein the boom is structurally supported at spaced points for swinging movement and further may be moved rectilinearly either during or independently of such swinging movement.

It is still another object of this invention to provide an extensible boom device which is of simple and durable design and economical to produce.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

In the drawings,

FIG. 1 is a perspective illustration of an embodiment of this invention mounted in a typical van, a portion of the van being cut away for clarity of illustration;

FIG. 2 is a perspective view of the extensible boom of this invention;

FIG. 3 is a partial cross-section taken substantially along section line 3—3 of FIG. 2;

FIG. 4 is a fragmentary sectional view taken substantially along section line 4—4 of FIG. 3;

FIG. 5 is a fragmentary sectional view taken substantially along section line 5—5 of FIG. 2; and FIG. 6 is a perspective end view of a portion of the main support section of the extensible boom.

DESCRIPTION OF THE PREFERRED EMBODIMENT

Referring to the drawings, and more particularly to FIG. 1, a conventional van 10 has a body provided with rear and side doors (not shown). A supporting framework generally indicated by the reference numeral 12 is mounted within the load-carrying portion of the van and more particularly on the floor 14. This framework 12 includes two elongated, channel shaped frame members 16 and 18, which serve as tracks as later explained, supported at the ends thereof by means of four legs 20 having brackets 22 at the lower ends for securement to the vehicle floor. Additional legs as shown in phantom may be used. The elongated members 16 and 18 may be secured to the upper ends of the uprights 20 by any suitable means such as by welding or threaded fasteners. Cross members 24 are secured at the ends thereof to the ends of the members 16 and 18 thereby to complete the rigid rectangular framework 12 which defines a loading space therewithin.

The members 16 and 18 are positioned with the channels facing each other, the channels being defined by upper and lower flanges 26 and 28. The flanges 26 and 28 serve as tracks for supporting a carrier 30 for movement longitudinally thereof.

The carrier 30 includes a frame in the shape of a sector of a circle, the frame including two radial beams 32 and 34 having secured to the ends thereof an arcuately shaped track 36 which may also be formed of channel-shaped stock. The two beams 32 and 34 are secured together at the ends thereof by some suitable means such as welding or threaded fasteners and further has a pivot plate 38 rigidly mounted thereon also by means of welding or threaded fasteners. The plate 38 is horizontally disposed and lies within the planar configuration of the beams 32 and 34.

Two laterally offset rollers 40 and 42 are mounted on the opposite ends of the beam 34 and are of such size as will fit between the flanges 26 and 28 and to ride within member 18 on the flanges 26 or 28. Another roller 44 which enters the channel of the frame member 16 to ride on the flange 28 thereof is rotatably mounted on the extremity of a horizontal support suitably secured to the arcuate track 36 and coplanar therewith. The extremity of the support 46 positions the roller 44 within the channel member 16. Another roller 48 is mounted on the end of the beam 32 to ride within the channel member 16 thereby completing the installation of the carrier 30 within the two members 16 and 18. The carrier 30 can thus be longitudinally moved within the channel member 16 and 18, riding on the flanges 26 and 28 which serve as tracks.

A boom assembly 50 is supported on the carrier 30 for swinging movement. This swinging movement is provided by a pivot pin 52 secured to the end of the boom assembly 50 and rotatably secured to the pivot plate 38. Further swinging or pivot support is provided by means of a roller 54 mounted on a bracket 56 secured to the top side of the boom assembly 50, both the pivot pin 52 and the roller 54 being of such size and strength as to provide load-carrying support for the boom assembly 50.

The boom assembly 50 is extensible comprising essentially a first or main boom section 58 which telescopically receives a second or extendable boom section 60. Referring first to the main boom section 58, it includes two elongated, channel-shaped elements 61 and 62 secured in spaced apart facing relationship by means of suitable cross straps 64 as shown. Each of the channel elements 61 and 62 is provided with a bar-like rail 66 having a flat upper surface 68 which extends parallel to the flanges 70 and 72 of the channel element 61, 62. At the distal end of the main boom section 58, the rails 68 are provided with ramp portions 74 which is more clearly shown in FIG. 5. As shown in FIGS. 2 and 6, the distal end of the main boom section 58 has an elongated space 76 formed between the flanges 72 of the channel elements 61 and 62, the strap 64 which is secured between the two channel elements 61 and 62 at the bottoms thereof being located at the rear end of the main boom section 58 as shown more clearly in FIG. 2. Thus assembled, the main boom section 58 constitutes a rigid, hollow member into which the extendable section 60 may be telescoped.

Referring to the section 60, it comprises two elongated members 78 and 80 L-shaped in cross-section which are secured in spaced apart parallel relationship by means of two end plates 82 and 84. The resulting section has a stepped exterior in cross-section which in shape and dimension complements the spaces formed between the rails 66 and flanges 72 of the boom section 58 so as to be slidably received thereby. As shown in FIG. 3, the upper surfaces of the two members 78 and 80 as indicated by the numeral 86 are coplanar and are disposed beneath the plane formed by the two surfaces 68 of the rails 66. From the foregoing it will be apparent that properly dimensioned, the extendable section 60 may be slid or otherwise telescoped completely into the boom section 58.

A rectangular hoist-carrying block 88 slidably fits between the two members 78 and 80 and is of a cross-sectional size that fits within the space defined between the members 78 and 80. This block 88 is supported on the upper surfaces 86 by means of two elongated axles or rollers 90 journalled in pillow block bearings 92 which are secured to the upper surface of the block 88. Thus the block 88 may be freely moved longitudinally within the boom sections 58 and 60 by reason of the rolling engagement of the axles 90 with the surfaces 68 and 86.

As shown in FIG. 4, a suitable hand operated hoist mechanism 94 which may be mounted on or within the block 88 provides a cable 96 to be used for suspending a load. The cable 96 may be positioned over a load to be lifted by adjusting the hoist block 88 as well as the boom section 60 longitudinally with respect to the boom section 58 and further by swinging the boom assembly 50.

When it is desired to retract fully the extension 60 within the sections 61 and 62, the section 60 is merely moved inwardly until it is fully telescoped within the section 58. During retraction of the hoist block 88, a point will be reached at which the axles 90 will start entering the boom section 58 at which it engages the ramp portions 74 on the rails 66. Further movement of the hoist block 88 into the section 58 causes the rollers 90 to ride up onto the rail surfaces 68 thereby lifting the axles 90 out of engagement with the upper surfaces 86 of the boom extension 60. This frees the extension 60 for free sliding movement into the boom section 58 without carrying the hoist block 88 therewith.

With the boom assembly extended to the position shown in FIG. 2, any load on the end of the boom will result in frictionally locking the two boom sections 58 and 60 together. However, the hoist block 88 is free to move on the surfaces 86 of the boom extension 60 to position the hoist cable 96 where desired.

Referring once again to FIG. 1, the boom 50 is shown extended through the side doorway of the van. It may now be used to lift a load (not shown) disposed on the side of the van to a position thereinside by first operating the hoist to elevate the load, then retracting the hoist block 88 into section 58 and then retracting the boom extension 60 into the section 58 until the load is moved to the inside of the van following which the boom 58 may be pivoted about the pin 52 and on the roller 54 and further moved lengthwise by reason of longitudinal movement of the carrier 30 on the two tracks 16 and 18 to the desired location within the van. The hoist is then operated to lower the load to the floor of the van.

Similarly, if it is desired to load or unload through the rear door of the van, the boom 60 is retracted to a position within the van and is then swung around to a position at which it can be projected through the rear doorway. The carrier 30 is then moved on the tracks 16 and 18 to an extent as will position the boom 50 either near or within the doorway. The boom may then be manipulated to extend it through the doorway following which the hoist is manipulated to pick up a load or deposit one.

The apparatus is especially unique in its simplicity, strength and facility of operation. The space within the framework 12 is substantially unencumbered by the boom and carrier mechanisms. The carrier 30 lies substantially within the plane of the tracks in the upper portion of the framework and the boom 50 is also disposed in this upper region immediately adjacent the carrier 30. Thus a maximum of lifting height is provided which enables reaching any portion of the vehicle inside the framework space. The carrier 30 in combination with the tracks 16 and 18 support the boom 50 at spaced points thus providing for a more stable mounting for the boom regardless of its position relative to the carrier 30 or the tracks 16 and 18. While the apparatus is simple in design, strong and easily operated, it further enables one person to load a van with relative ease with access to both the side and rear doors thereof.

While this invention has been described in connection with a van type vehicle, it is to be understood that it also may be used in the bed of a pickup truck or the like. Furthermore, the apparatus may be mounted on any floor surface for the handling of articles.

While there have been described above the principles of this invention in connection with specific apparatus, it is to be clearly understood that this description is made only by way of example and not as a limitation to the scope of the invention.

What is claimed is:

1. Apparatus for loading and unloading a vehicle comprising a supporting frame having a pair of parallel spaced horizontally extending elongated tracks supported near the ends thereof by upstanding legs and elongated cross members operatively secured to said tracks adjacent the upper ends of said legs thereby defining a loading space within said frame; a hoist carrier frame mounted on said tracks for movement longitudinally thereof, said carrier frame lying substantially within the plane of said tracks to be disposed at the top portion of said space; a hoist boom pivotally connected to said carrier frame adjacent one of said tracks, said boom extending horizontally beneath said carrier frame and swingable across said space between said tracks, said carrier frame including elongated elements secured together in the shape of a sector of a circle, the arcuate portion of said carrier frame serving as a trackway, said pivotal connection being adjacent to the apex formed by said two straight sides, said boom having first means movably engaged with said trackway to support swinging movement of said boom, said carrier frame having second means movably engaged with the other of said tracks, one straight side of said sector being disposed parallel to one of said tracks and having third means movably engaged with said one track at longitudinally spaced points thereon, the other straight side of said sector extending between said tracks.

2. The apparatus of claim 1 wherein said first, second and third means include rollers, a pivot plate secured to both said straight sides at the apex thereof, and said pivotal connection including a pivot pin extending between the end of said boom and said plate.

3. The apparatus of claim 2 wherein said tracks are in the form of elongated elements which are channel shaped in cross-section, the open sides of said tracks being in facing relation, the rollers on said carrier frame rotatably fitting into the channels of said elongated elements thereby being guided and supported for movement longitudinally thereof, the roller on said boom engaging the upper surface of said trackway, said boom further being disposed beneath but in substantial parallelism with said tracks and carrier frame.

4. The apparatus of claim 3 wherein said boom is extensible beyond the periphery of said supporting frame.

5. The apparatus of claim 1 including a vehicle having a load-supporting portion, said supporting frame being mounted on said load-supporting portion.

6. The apparatus of claim 5 wherein said vehicle is a van and said supporting frame being mounted on the floor thereof, said van having door openings on the rear and side and said carrier and boom being manipulable to extend of said boom through a selected one of said door openings.

7. The apparatus of claim 1 wherein said boom is extensible and includes a first elongated hollow section which receives for longitudinal telescoping movement a second elongated section, said first section being pivotally connected to said carrier frame and being further operatively supported by said carrier frame along an arcuate portion thereof spaced from said pivotal connection.

8. The apparatus of claim 7 wherein said first section includes two channel-like elements having the open sides in facing relation, each channel-like element having an elongated rail on the inner side which is spaced from and parallel to the flanges thereof, said rails having ramp portions on the outer ends merging with upper surfaces thereon which are flat and extend parallel to said flanges, cross members securing said channel-like elements together, said second section includes two elongated members L-shaped in cross-section and secured together by means of cross members, said two members being disposed with the stepped sides outermost, the widest portion of the stepped sides being slidably received between the lower flanges and rails of said first section, the upper surface of said second section being disposed beneath the flat upper surfaces of said rails, a hoist support block movably disposed within said second section and having a bearing thereon which mounts for rotation an elongated roller element, the opposite end portions of said roller element rotatably engaging the upper surfaces of said second section and engageable with said ramp portions and upper surfaces of said rails whereby said hoist support block can be moved into said first section, said second section being telescopicable into said first section thereby shortening the length of said boom.

* * * * *